(12) United States Patent
Molnar et al.

(10) Patent No.: US 10,696,395 B2
(45) Date of Patent: Jun. 30, 2020

(54) TETHERED UNMANNED AERIAL SYSTEM

(71) Applicants: Dezso Molnar, Sun Valley, CA (US); John Canavan, Sun Valley, CA (US)

(72) Inventors: Dezso Molnar, Sun Valley, CA (US); John Canavan, Sun Valley, CA (US)

(73) Assignee: WET, Sun Valley, CA (US)

(*) Notice: Subject to any disclaimer, the term of this patent is extended or adjusted under 35 U.S.C. 154(b) by 173 days.

(21) Appl. No.: 15/393,106

(22) Filed: Dec. 28, 2016

(65) Prior Publication Data

US 2017/0240277 A1     Aug. 24, 2017

Related U.S. Application Data

(60) Provisional application No. 62/271,634, filed on Dec. 28, 2015.

(51) Int. Cl.
    *B64C 39/02*     (2006.01)
    *B05B 17/08*     (2006.01)
    (Continued)

(52) U.S. Cl.
    CPC ............ *B64C 39/022* (2013.01); *B05B 17/08* (2013.01); *B64C 39/024* (2013.01); *B64D 47/04* (2013.01); *B64F 3/02* (2013.01); *B66D 1/28* (2013.01); *B66D 1/485* (2013.01); *B66D 1/60* (2013.01); *F21S 10/002* (2013.01); *G03B 21/10* (2013.01); *G03B 21/608* (2013.01); *G09F 13/00* (2013.01); *G09F 19/18* (2013.01); *G09F 21/06* (2013.01); *B64C 2201/06* (2013.01); *B64C 2201/128* (2013.01); *B64C 2201/148* (2013.01); *G03B 15/006* (2013.01)

(58) Field of Classification Search
    CPC ................ B64C 39/022; B64C 39/024; B64C 2201/148; B64C 2201/128; B64C 2201/06; G09F 19/18; G09F 21/06; G09F 13/00; F21S 10/002; B64F 3/02; B64D 47/04; B66D 1/60; B66D 1/28; B66D 1/485; B05B 17/08; G03B 15/006; G03B 21/608; G03B 21/10
    See application file for complete search history.

(56) References Cited

U.S. PATENT DOCUMENTS 3,503,574 A    3/1970   Eickmann
4,010,619 A    3/1977   Hightower et al.
(Continued)

FOREIGN PATENT DOCUMENTS

CN     103241377     8/2013
CN     203294314     11/2013
(Continued)

OTHER PUBLICATIONS

Vila, Oscar; [Power Electronics 01] Design of the Power Electronics of Tethered UAV; Master Thesis; Bio, Electro and Mechanical Systems, http://beams.ulb.ac.be/student-projects; Oct. 20, 2014; 2 pages.

(Continued)

*Primary Examiner* — Rodney A Butler
(74) *Attorney, Agent, or Firm* — Maceiko IP

(57) ABSTRACT

A tethered unmanned aerial system (UAS) is described, wherein the flight of one or more UASs may be used in connection with a water and light display.

10 Claims, 10 Drawing Sheets

(51) Int. Cl.

| | | |
|---|---|---|
| B66D 1/60 | (2006.01) | |
| G03B 21/10 | (2006.01) | |
| B66D 1/48 | (2006.01) | |
| B66D 1/28 | (2006.01) | |
| G09F 13/00 | (2006.01) | |
| G09F 21/06 | (2006.01) | |
| G03B 21/60 | (2014.01) | |
| G09F 19/18 | (2006.01) | |
| B64D 47/04 | (2006.01) | |
| B64F 3/02 | (2006.01) | |
| G03B 21/608 | (2014.01) | |
| F21S 10/00 | (2006.01) | |
| G03B 15/00 | (2006.01) | |

(56) References Cited

U.S. PATENT DOCUMENTS

| | | |
|---|---|---|
| 5,293,304 A | 3/1994 | Godfrey |
| 5,769,359 A | 6/1998 | Rutan et al. |
| 6,200,185 B1 | 3/2001 | Kuster, Jr. |
| 6,270,038 B1 | 8/2001 | Cycon et al. |
| 6,547,180 B1 | 4/2003 | Cassidy |
| 6,575,402 B1 | 6/2003 | Scott |
| 6,749,154 B1 | 6/2004 | Johnson |
| 6,933,965 B2 | 8/2005 | Heafitz |
| 7,055,994 B2 | 6/2006 | Martin |
| 7,082,706 B1 | 8/2006 | Stinis et al. |
| 7,249,732 B2 | 7/2007 | Sanders et al. |
| 7,324,016 B1 | 1/2008 | Milgram |
| 7,414,546 B2 | 8/2008 | Singer et al. |
| 7,472,866 B2 | 1/2009 | Heaston et al. |
| 7,631,834 B1 | 12/2009 | Johnson et al. |
| 7,668,403 B2 | 2/2010 | Kanowitz |
| 8,056,461 B2 | 11/2011 | Bossert et al. |
| 8,091,822 B2 | 1/2012 | Boyce |
| 8,100,649 B2 | 1/2012 | Okimura |
| 8,109,711 B2 | 2/2012 | Blumer et al. |
| 8,123,460 B2 | 2/2012 | Collette |
| 8,157,383 B2 | 4/2012 | Scanlon |
| 8,369,399 B2 | 2/2013 | Egnal et al. |
| 8,434,920 B2 | 5/2013 | Jones |
| 8,511,818 B2 | 8/2013 | Fuller et al. |
| 8,511,828 B2 * | 8/2013 | Fuller ............... G03B 3/12 239/18 |
| 8,554,395 B2 | 10/2013 | Andersson |
| 8,567,718 B1 | 10/2013 | McDonnell |
| 8,596,572 B1 | 12/2013 | Kirshman et al. |
| 8,600,602 B1 | 12/2013 | McAndrew et al. |
| 8,646,719 B2 | 2/2014 | Morris et al. |
| 8,777,157 B2 | 7/2014 | Barrett et al. |
| 8,825,225 B1 | 9/2014 | Stark et al. |
| 8,862,285 B2 | 10/2014 | Wong et al. |
| 9,169,030 B2 | 10/2015 | Wong et al. |
| 9,174,733 B1 | 11/2015 | Burgess et al. |
| 10,364,026 B1 * | 7/2019 | Hanlon ............... B64F 3/02 |
| 10,384,777 B1 * | 8/2019 | Welsh ............... B64C 39/022 |
| 2002/0049728 A1 | 4/2002 | Kaku |
| 2002/0171927 A1 | 11/2002 | Barnes |
| 2004/0020999 A1 | 2/2004 | Beidokhti |
| 2005/0146884 A1 | 7/2005 | Scheithauer |
| 2005/0219479 A1 | 10/2005 | Mugrauer |
| 2006/0140644 A1 | 6/2006 | Paolella |
| 2008/0165547 A1 | 7/2008 | Amor et al. |
| 2008/0313937 A1 | 12/2008 | Boyce |
| 2010/0027281 A1 | 2/2010 | Waters et al. |
| 2011/0180667 A1 | 7/2011 | O'Brien et al. |
| 2012/0044710 A1 | 2/2012 | Jones |
| 2012/0056041 A1 | 3/2012 | Rhee et al. |
| 2012/0112008 A1 | 5/2012 | Holifield et al. |
| 2012/0153087 A1 | 6/2012 | Collette |
| 2012/0200703 A1 | 8/2012 | Nadir et al. |
| 2012/0250335 A1 | 10/2012 | Nakano |
| 2013/0062457 A1 | 3/2013 | Deakin |
| 2013/0077330 A1 | 3/2013 | Hessling |
| 2013/0134254 A1 | 5/2013 | Moore |
| 2013/0233964 A1 | 9/2013 | Woodworth et al. |
| 2013/0248097 A1 | 9/2013 | Floss, Jr. |
| 2013/0314502 A1 | 11/2013 | Urbach et al. |
| 2014/0002990 A1 | 1/2014 | Sharma et al. |
| 2014/0018976 A1 | 1/2014 | Goossen et al. |
| 2014/0131510 A1 | 5/2014 | Wang et al. |
| 2014/0217242 A1 | 8/2014 | Muren et al. |
| 2014/0231590 A1 | 8/2014 | Trowbridge et al. |
| 2014/0233099 A1 | 8/2014 | Stark et al. |
| 2014/0236388 A1 * | 8/2014 | Wong ............... B64C 39/024 701/2 |
| 2014/0257595 A1 | 9/2014 | Tillmann |
| 2014/0263852 A1 | 9/2014 | Walker et al. |
| 2014/0268838 A1 | 9/2014 | Kimball et al. |
| 2014/0374535 A1 | 12/2014 | Wong et al. |
| 2015/0129716 A1 | 5/2015 | Yoffe |
| 2015/0154890 A1 | 6/2015 | Savitsky et al. |
| 2015/0329218 A1 | 11/2015 | McDonnell et al. |
| 2015/0362917 A1 | 12/2015 | Wang et al. |
| 2016/0033855 A1 | 2/2016 | Wong et al. |
| 2016/0041628 A1 | 2/2016 | Verma |
| 2016/0068266 A1 | 3/2016 | Carroll |
| 2016/0200437 A1 * | 7/2016 | Ryan ............... B64C 39/022 244/99.2 |

FOREIGN PATENT DOCUMENTS

| | | |
|---|---|---|
| DE | 20 2009 01729 | 3/2010 |
| JP | 2012-190557 | 10/2012 |
| JP | 2013-211200 | 10/2013 |
| KR | 10-2008-0074045 | 8/2008 |
| KR | 10-2010-0041367 | 4/2010 |
| KR | 10-2011-0090231 | 8/2011 |
| WO | WO 2002-044809 | 6/2002 |
| WO | WO 2006-016018 | 2/2006 |
| WO | WO 2007-141795 | 12/2007 |
| WO | WO 2013-162128 | 10/2013 |

OTHER PUBLICATIONS

Eurolink Systems; Cobra—Micro Tethered Surveillance; ERMES by EuroLink Systems, Ermes Technologies; Oct. 21, 2014, 3 pages.
Finch, Andy and Ballew, Eric; Direct Spray Cooling and System-Level Comparisons; Electronics Cooling Magazine; www.electronics-cooling.com; Aug. 1, 2009; 5 pages.
Staes, Patrick; Drone @ Work; Aerial Imaging and Filming; http://drone-at-work.com; Oct. 21, 2014, 6 pages.
Quick, Darren; CyPhy Works' UAVs Use Ground-Based Power to Stay Aloft Indefinitely; www.gizmag.com, Dec. 5, 2012, 4 pages.
Burkhart, Ford; DSS 2013: Tiny Drone Flies on Fiber-Optic Power; the business of photonics optics.org; http://optics.org/news; May 2, 2013; 2 pages.
LEDs Magazine; Oxley Supplies LED Lights to BAE Unmanned Air Vehicle; www.ledsmagazine.com; Oct. 17, 2014; 11 pages.
"Heat Transport by Radiation", U.S. Appl. No. 14/922,061, filed Feb. 9, 2017 Office Action, dated May 2010, 3 pages.
Lai, Yan, et al., "Liquid Cooling of Bright LEDs for Automotive Applications", 2009, Applied Thermal Engineering 29 (2009), pp. 1239-1244, U.S. Appl. No. 14/922,061, filed Feb. 9, 2017 Office Action.
PCT, International Search Report and Written Opinion of the International Searching Authority, PCT/US2015/057249, dated Feb. 17, 2016, 10 pages.
"Phantom 2 User Manual V1.1," Apr. 30, 2014, 2013-2014 DJI Innovations, 34 pages, U.S. Appl. No. 14/922,061, filed Feb. 9, 2017 Office Action.
"Spreading Wings S900 User Manual", Aug. 2014, 2014 DJI, 32 pages, U.S. Appl. No. 14/922,061, filed Feb. 9, 2017 Office Action.
Wang, Ruishan, et al., "A Cooling System with a Fan for Thermal Management of High-Power LEDs", Aug. 2010, J. Mod. Phys., 2010, 1, pp. 196-199, U.S. Appl. No. 14/922,061, filed Feb. 9, 2017 Office Action.

* cited by examiner

TETHERED UNMANNED AERIAL SYSTEM

CROSS REFERENCE TO RELATED APPLICATIONS

This application claims the benefit of U.S. Provisional Application No. 62/271,634, filed Dec. 28, 2015, the contents of which are incorporated herein by reference.

FIELD OF THE INVENTION

The field of the invention generally relates to unmanned aerial systems (UASs), including the UASs that may be tethered to the ground or other base or item.

BACKGROUND OF THE INVENTION

Recently, the use of UASs in connection with entertainment and displays has been suggested. For example, in US Publication Nos. US2014/0236388; US2014/0231590 and US2014/0123099, it is suggested that a number of untethered UASs with lights flying in formation may provide an array of "flixels." This same applicant suggests using untethered UASs to carry character figures in the sky and moving the UASs to make it appear that the figures are moving like marionettes. Alternative uses for untethered UASs as part of a display have also been suggested.

In all these suggested uses, however, the UAS has a power supply onboard to achieve flight, presumably a battery of significant weight. And in these suggested uses, the UAS would additionally be required to carry a payload. For example, a lamp and its power source carried aloft by a UAS must be sufficiently large and/or powerful if the lamp is to be visible while high off the ground, and to overcome area light pollution. The same holds true for size and visibility if the UAS is to lift a flying marionette.

In view of the foregoing, it would appear that the UASs contemplated by the foregoing would be large and powerful enough to keep their payload aloft, and potentially exceed five pounds in weight. However, regulations may impose weight restrictions on untethered UASs used for commercial purposes, such as display and entertainment to paying customers. Accordingly, there exists a need for a tethered UAS that may be legally used for commercial purposes. There also exists a need for a tethered UAS that may avoid the need to carry significant weight aloft.

Some UASs which are tethered to a base, such as a military vehicle, have been disclosed in the literature. However, these UASs have typically been used in military or data acquisition purposes, and have not been used in displays such as water and light displays, and thus do not address how a UAS may be used in a display application.

Where non-tethered UASs have been suggested for use with displays as noted above, other issues arise. For example, such non-tethered UASs are typically controlled by radio signals. However, such radio signals may be interrupted by nearby radio transmissions, may malfunction, or may otherwise send erroneous commands. Worse yet, malevolent third parties may intentionally interfere with the radio transmissions to control the UASs. Accordingly, there exists a need for a UAS that may be controlled with a reliable source of control signals to control the UAS's flight and other actions.

Another issue is that non-tethered UASs have the potential to fly off and injure persons observing the display or elsewhere. This may occur where the above-referenced interference occurs, or where some other mis-programming, erroneous control commands, or other malfunction occurs. Accordingly, there is a need for a UAS that is prevented from flying off its intended or desired path and/or injuring someone.

In certain situations, nets may be used in public demonstrations involving UASs to protect viewers in the event a UAS flies toward the crowd. However, such a net would not be suitable for a large water display, such as where fountains are located in a several acre reservoir, due to their enormity, the challenges of managing large nets in windy conditions, and the undesirable effect of visual interference for spectators.

As noted above, where a UAS is not tethered to the ground, it will typically include a battery with a limited duty cycle and lifespan as its power source. When the battery power begins to degrade, the UAS may behave erratically or be unable to stay aloft. This effect may be acceleration where the UAS carries high-power lighting, marionettes or other items that may be heavy and rapidly deplete battery power. Accordingly, there is a need for a UAS that may stay aloft for extended periods even when supporting heavy payloads. Additionally, there is a need for a UAS which carries a battery, as a standby power source in the event of a disruption of power from its tethered ground source.

SUMMARY OF THE INVENTION

In a first aspect of the invention, a UAS is described that is tethered to the ground, to a ground station or to another fixed or movable point.

In another aspect of the invention, a tethered UAS is described where the tether is used to deliver power to the UAS, and to systems and payloads configured with the UAS. In this aspect, the power source may be on the ground or base instead of being carried aloft by the UAS, and may provide constant power to the UAS and associated systems. This preferably allows the UAS to fly longer or indefinitely, carry heavier payloads when relieved of battery weight, and/or perform other tasks that would not be possible with a non-tethered UAS having limited battery power.

In another aspect of the current invention, a UAS that is powered through the use of a tether may avoid regulations regarding weight restrictions and/or use in commercial applications. In this aspect, for example, the UAS may avoid regulations regarding the commercial use of free-flying UASs.

In another aspect of the invention, a tethered UAS is described where the tether transmits control signals to the UAS. This may occur through hard-wired electrical signals, light over fiber optic lines or other means. As such, there is no need for radio transmissions to be used and the threat of external interference is avoided or overcome. In a preferred embodiment, the tether may include data lines that permit bidirectional communication. In this manner, the tether may transmit information between the UAS and a ground station or base regarding the UAS's location, status or other information regarding its onboard systems.

In another aspect of the invention, the tether used by the UAS may physically restrict the UAS from entering no-fly zones such that audience members and nearby structures remain safe from malfunctioning, crashing, landing or low flying UASs. To this end, it is preferred that the tether exhibit sufficient tensile strength to contain the UAS, and malleability and resilience to last over repeated bendings of the tether. Tethering UASs may provide a method of flying UASs in no-fly zones near airports where free-flying UASs are categorically restricted, and may trigger GPS lockouts programmed into the UAS flight controllers to keep them grounded in such areas.

In another aspect of the invention, the tether connecting the UAS to the ground or other base is described to include a single winch or other means that controls the length of the tether in order to position the UAS during its flight. In this aspect, with the UAS providing constant lift in the Z dimension, a single winch may be used to control the position of UAS in the Z dimension such that onboard flight control and navigation systems may not be required. This may allow the UAS to be an off-the-shelf UAS thus avoiding the added cost and complexity of developing special UASs for the purposes of illuminating a water display. This may also allow the UAS to carry heavy payloads or to potentially weigh less than a specified amount to avoid regulations.

In this aspect of the invention, the winch may be programmable or may be controlled by an automated control system such that it may control the UAS in a choreographed manner that may be synched and coordinated with the lighting and water elements of the water and lighting display. This aspect may include a single winch controlling a single UAS, or an array of multiple winches controlling multiple UASs. This aspect of the invention may be preferable for light or very light UASs to provide consistent tension on the tether.

In another aspect of the current invention, a tether system where the winch is above the display field may be employed. This system allows the UAS to move in relatively unrestricted flight, while also providing support for the weight of the tether by the winch or anchoring location. By relieving the UAS of much of the weight associated with lifting the tether, the useful load of the UASs lifting capacity can be directed toward a lamp or other payload, rather than the ever-increasing weight of the tether line the higher a UAS flies above a ground-based anchor point.

In another aspect of the current invention, a winch is described that may move its position in the X and Y dimensions to also control a tethered UAS in these dimensions in addition to the Z dimension. For instance, the winch may be attached to a carriage that may travel along rails positioned on or near the ground. This aspect may include a single winch that may control a single UAS as it travels along the rails, or may include an array of winches that travel along multiple rails as they each control a UAS in the X, Y and Z dimensions. This UAS winch arrangement may be used in connection with water and lighting displays, and as such, may retain enough freedom of movement to complement the undulating water streams which typically originate from static locations, yet provide a substantial effect of movement, especially when in large arrays.

In yet another aspect of the current invention, two winches offset along an axis are described to control the position of the UAS along the axis defined by the position of the two winches as well as in the Z dimension. Alternatively, three winches offset along the X-axis and Y-axis are described to control the position of the UAS in all three X, Y and Z dimensions. In these aspects of the invention, the UAS may not require onboard flight control and navigation systems which may allow the UAS to be an off-the-shelf or relatively light UAS and thus avoid the added cost and complexity of developing special UASs for the purpose of illuminating or enhancing a water display. This may also allow the UAS to carry heavy payloads and be an extremely heavy lifting machine, or to potentially weigh less than a specified weight in order to avoid pertinent regulations.

In another aspect of the current invention, the use of one, two, three or other number of winches to control one or more tethered UAS(s) and restrict the UAS(s) from entering no-fly zones is described.

In another aspect of the current invention, a tethered UAS controlled by winches is described to continually monitor its onboard systems, and if an alert is detected that may threaten the safety of the UAS and the audience below, a command may be issued to the winches to reel in the UAS before it may crash or otherwise create a dangerous environment.

In yet another aspect of the current invention, infrared light sources may be positioned on or near the ground at the perimeters of safe-fly zones and configured to project beams of light upward. In this aspect, the UAS may be configured with detectors that may detect the upward beams such that upon detection of these beams the UAS may be known to be crossing from a safe-fly zone into a no-fly zone and may be instructed to reverse, drop, or otherwise alter course.

In another aspect of the current invention, infrared light sources and detectors may be positioned at the perimeter of safe-fly zones such that beams of light may transmit from the sources to the detectors across areas of air space that may be obstructed by the UAS if the UAS flies from a safe-fly zone into a no-fly zone. If the UAS crosses a beam and obstructs it, the detector preferably senses this event and the UAS will be instructed to reverse or otherwise alter course.

In yet another aspect of the current invention, multiple UASs may be daisy chained or otherwise connected or configured together vertically, horizontally or in other configurations while attached to the same tether or tethers, or winch or winches.

In another aspect of the invention, tethered UASs are described where the tethers extend above the UASs. This embodiment may be particularly suited for indoor use where the overhead tethers are coupled to winches supported by an overhead structure.

In another aspect of the invention, the tether and winch assembly may be carried by the UAS, and the distal end of the tether may be attached to the ground or other base location.

DETAILED DESCRIPTION OF THE PREFERRED EMBODIMENTS

Figure 1:
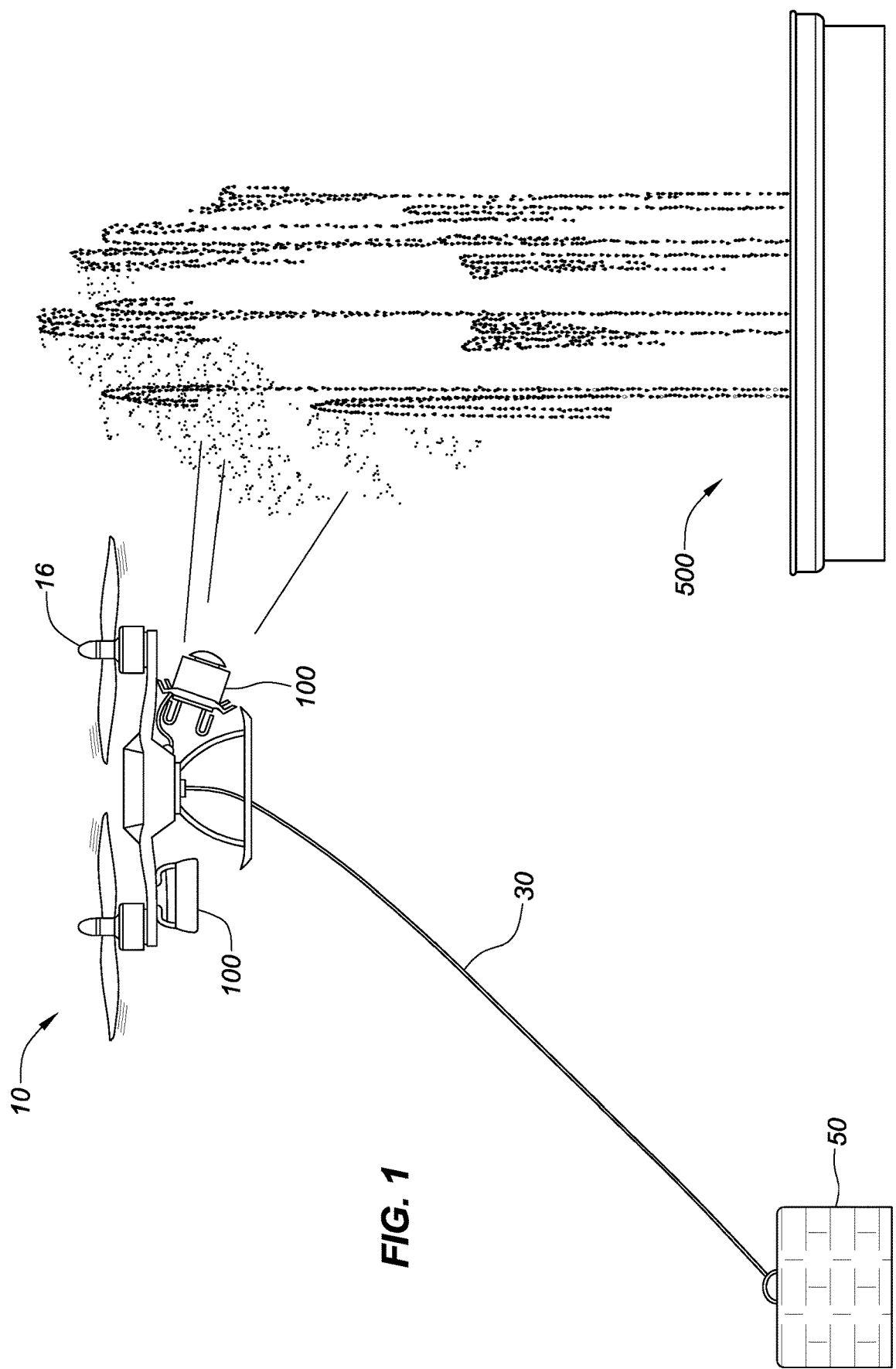
FIG. 1 is a side view of a tethered UAS illuminating a water display.

The following detailed description is not intended to limit the current invention, in that alternate embodiments will be apparent to those skilled in the art. For example, some of the tether systems of the current invention may assume different configurations and may be utilized with different types of UASs. Also, the water displays depicted in the figures are examples only, and the displays for use with the current invention may vary in the number, location and type of water features, and may include lighting and/or other effects. In the figures, the same or similar reference numerals may refer to the same or similar elements throughout the different views, as well as within the description below.

In one embodiment of the current invention as shown in FIG. 1, UAS 10 may include tether 30 that may generally be secured to UAS 10 on one end or a distal end, and to a ground station or other fixed or movable location 50 on the other end or proximal end. In this configuration, tether 30 may generally be flexible to accommodate a flight path of UAS 10. Tether 30 may comprise of safety cords, cables, braided or woven ropes, metal wires, strings, or other types of structures. It is preferred that tether 30 exhibit properties so that it may withstand repeated bending and tension.

While FIG. 1 depicts the lower end of tether 30 attached to ground station 50, it may also be attached directly to the ground, to a winch or to any other structure that may be positioned on or near the ground. The type of ground structure may vary. UAS 10 may be configured to carry a payload appliance 100 such as a lighting system that may be used to illuminate water display 500 or other structure as depicted in FIG. 1. Other payloads 100 that UAS 10 may carry may include a camera (not shown), a screen (not shown) or other type of payload.

Ground station 50 may include one or more power sources, one or more winches, an automated control system to control UAS 10, a manual control system to control UAS 10 that may also include one or more operators, and other systems and components that may be utilized to control, communicate, direct, maintain, power or otherwise interact with UAS 10.

Tether 30 may embody a variety of different purposes and uses. In one embodiment, tether 30 may include electrical wires, cables, transmission lines or other types of structures to deliver power to UAS 10, to payload appliance 100 and to other systems that may be a part of or configured with UAS 10. In this scenario, the battery, electrical generator or other power source may be located in the ground station 50 or in any other location on or near the ground or at the general proximal end of tether 30. In this manner, the electrical wires or cables of tether 30 may be attached and generally configured to receive energy from the power source. This may eliminate the need to have a power source such as a battery onboard UAS 10, thus reducing airborne weight and providing other benefits. The distal end of the tether 30 connected to UAS 10 may be configured such that the electrical wires or cables that may provide power to UAS 10 may be connected to the necessary electrical systems of UAS 10, payload appliance 100 or any other system that may require power such that the power and control signals are adequately delivered.

A first benefit of providing power to UAS 10 via tether 30 may be to eliminate the need to replace or recharge onboard batteries. It is well known that batteries have a limited duty cycle before they are depleted of energy or degrade in their energy. Onboard battery sources may be able to provide UAS 10 with enough energy to maneuver aloft while also powering its various onboard systems and payload appliances 100, but with time and as the battery source loses power, this ability will diminish and eventually end.

Once the battery duty cycle decreases below a certain threshold, propellers 16 may no longer have enough power to provide the necessary lift for UAS 10 to stay aloft and any lighting systems or other payloads 100 may no longer have enough power to function properly. At this point, it may be necessary to land UAS 10 and to either replace the onboard battery or to recharge it. Conversely, by providing power via tether 30, the duty cycle provided to power UAS 10 and payload 100 may remain constant or otherwise sufficient, thus ensuring continual operation of UAS 10 and payload 100 without the need to land UAS 10 and replace or recharge any onboard battery source. The foregoing preferably allows UAS(s) 10 to participate in a display with more reliability and accuracy.

Second, because onboard batteries may have significant weight, removing some or all onboard batteries from UAS 10 may significantly reduce the overall weight of UAS 10. This may allow UAS 10 to instead carry other additional or heavier payload appliances 100 since the given amount of lift provided by propellers 16 need not be devoted to carrying the weight of their power source.

For example, where UAS 10 provides lighting to a water display or other type of structure, eliminating the weight of the onboard battery allows additional lights 100 to be carried by UAS 10 which may allow UAS 10 to provide brighter light to the display that may be visible from further away and may better overcome any nearby light pollution. As another example, UAS 10 may be able to carry a heavier camera (or example, a high definition camera) due to the weight savings. Other items may also be carried by UAS 10 given the weight savings of no onboard power source.

In addition, by utilizing tethers 30, UASs 10 may preferably weigh less than a specified weight to meet restrictions imposed by pertinent regulations. This may avoid restrictive regulations regarding the commercial usage of drones. Such commercial UAS regulations may include one or more of the following: 1) the UASs may only be flown within the sight of the operator, 2) the UASs may only fly up to 100 miles per hour, 3) operators of the drones must be at least 17 years of age, 4) operators of the drones must pass an aeronautics test and be vetted by the appropriate authority and 5) an operator may only control a single UAS. By utilizing tether 30 and thus avoiding such regulations, UASs 10 may avoid the time and costs associated with such restrictions. This may allow displays 500 to use UASs 10 in manners that would not otherwise be possible due to regulations. Furthermore, this increased flexibility in the manner in which UAS(s) 10 may be used may allow the choreography of the display to be more easily designed.

It is important to note that UASs 10 and payload appliances 100 may have significant weight, and that it may be difficult to achieve an overall weight under a specified amount in order to avoid restrictions imposed on drones as described above. However, it should also be noted that it is common for a significant proportion of the overall weight of a UAS 10 to be derived from an onboard battery, such that the elimination of the onboard battery may allow UAS 10 to weigh less than the threshold that would otherwise impose restrictions while still being able to carry and deploy any necessary payloads 100.

A second use of tether 30 may be to provide data transfer from ground station 50 to UAS 10, and from UAS 10 to ground station 50. To accomplish this data transfer, tether 30 may comprise of electrical wires, cables, optical fibers, transmission lines or other structures that may adequately transmit data to and from UAS 10. Data that may be sent to UAS 10 via tether 30 may include flight control and coordinate information to control the position and speed of UAS 10. This data may be received by UAS 10 and may direct UAS 10 to perform a desired choreographed flight pattern about a water display or other structure.

Data transmissions may also contain control information for any appliance payloads 100 that may be configured with UAS 10 such as lighting systems, cameras or other types of payloads. For example, data transmissions provided to lighting system 100 via tether 30 may include on/off sequences to turn the lights 100 on and off during a lighting show, color settings to change the color of the illumination, brightness settings, aperture settings and other settings that may be choreographed to other features of the display. Such data transmissions may also control the direction at which light, camera or other payload 100 is pointed relative to UAS 10.

In another example, data transmissions for a camera payload 100 may include trigger commands to take pictures or videos, focus settings, aperture settings, shutter speed settings and other settings. It can be seen that by receiving the combination of flight control commands and payload commands via tether 30, UAS 10 may perform a desired choreographed flight pattern about a water display while illuminating it or taking pictures or videos.

Data may also be sent from UAS 10 to ground station 50 via tether 30. For example, UAS 10 may send GPS position coordinates from its onboard GPS system to ground station 50 such that ground station 50 may determine the exact position of UAS 10. Ground station 50 may compare this data with its own data (e.g., preprogrammed data that reflects the desired choreography of a display) regarding the position of UAS 10 in order to calibrate its coordinate systems and apply correction factors to reposition UAS 10 to a desired position. For example, wind effects may be overcome.

UAS 10 may also send information to ground station 50 via tether 30 regarding the status of its various onboard systems, whether there is a problem with any of the systems, diagnostic information regarding any of its systems, and other data. This data may be utilized by ground station 50 to determine the overall wellbeing and viability of UAS 10 to perform its functions. It should be noted that UAS 10 may send data to ground station 50 via tether 30 simultaneously as ground station 50 may send UAS 10 data as described above. It should also be noted that UAS 10 may transmit and receive data via tether 30 from other sources other than ground station 50.

One benefit of utilizing tether 30 to send and receive data transmissions to and from UAS 10 may be to avoid any outside electromagnetic interference that may interfere or otherwise disrupt the data transmissions. For example, without tether 30 to transmit data to and from UAS 10, other types of data transmission techniques that are not transmission-line based, and that therefore must propagate through the air, would be required. These transmission techniques may include modulated or unmodulated radio frequency (RF) transmissions, microwave transmissions, millimeter wave transmissions and other types of transmissions.

It is well known that if multiple signals of these types are transmitted in the same air space at high enough power levels, they may disrupt each other and cause the loss of data transfer. Given that lighted UASs 10 may provide illumination to water displays in crowded urban settings, it may be common for the air space around such displays to have multiple transmitted signals present at the same time such that the data transmissions sent to and from UAS 10 and ground station 50 may be disrupted. However, data transmitted through a transmission line such as a cable or optical fiber is preferably not susceptible to interference by other signals in the nearby air space. Therefore, data transmitted via tether 30 to and from UAS 10 may be safe from such disruptions even in settings where additional signals may be present.

The use of pre-programmed choreography information in the UASs with GPS signals and preferably a differential GPS transmitter is another option to avoid any potential ground base signal interference. In this embodiment, however, it may be preferable to include measures to retain UAS 10 in the event of a malfunction, and to provide corrective input from the control base if UAS 10 has an error in navigation.

Another use of tether 30 with UAS 10 may be to provide safety mechanisms to ensure that UAS 10 does not fly into unsafe areas that may pose safety hazards to bystanders, structures or to UAS 10 itself. In general, because UAS 10 may be attached to tether 30, it may be impossible for UAS 10 to simply fly off beyond the length of tether 30 due to a strong gust of wind, an onboard mechanical malfunction or for other reasons. In this regard, tether 30 contains UAS 10 and preferably does not allow it to fly away.

Figure 2:
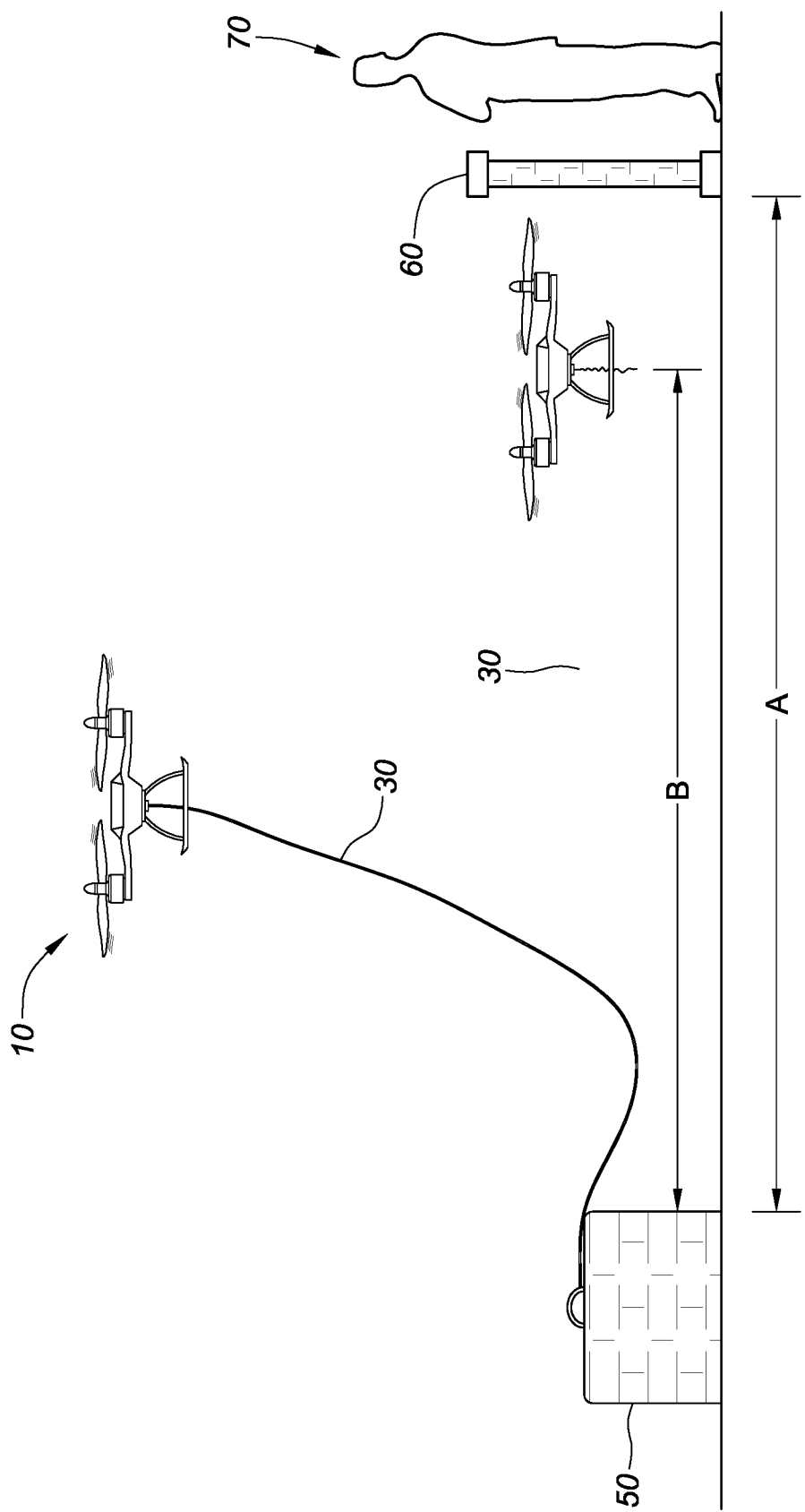
FIG. 2 is a side view of a tethered UAS with a tether restricting the flying distance of the UAS.

In another embodiment, tether 30 may be of a specific length that may limit the flying radius of UAS 10 in order to provide a safe-flying zone. For example, as depicted in FIG. 2, tether 30 may be of length B (as shown with the dashed line) when taut, and length B may be less than length A as shown. If bystanders 70 are restricted to be located at positions beyond length A from ground station 50, and UAS 10 is physically restricted and prevented from traveling beyond length A by tether of length B, bystanders 70 are safe from being struck by a landing, crashing or low flying UAS 10.

In addition, it can be seen that UAS 10 may be kept safe from colliding with structures that may be positioned beyond length A from ground station 50, such as wall 60 in FIG. 2, as long as tether 30 is of a length B that is less than length A. In this scenario, both UAS 10 and structure 60 are protected from any possible collisions that may result in damage to either UAS 10 or structure 60. While the above description described structure 60 as a wall, structure 60 may be any type of structure such as a building, a statue, power lines, or other type of structure.

Figure 3:
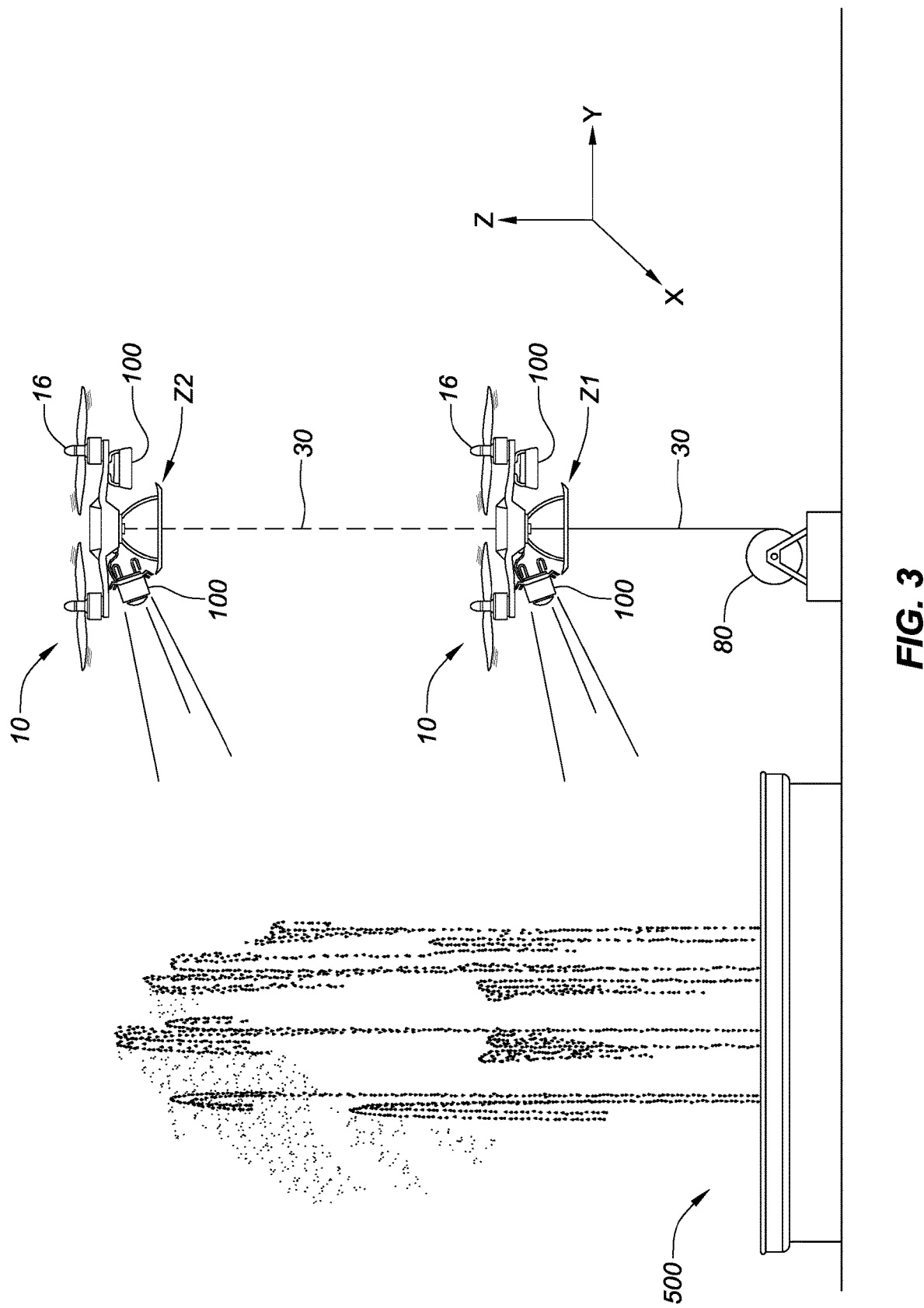
FIG. 3 is a side view of a tethered UAS controlled in the Z dimension by a winch while illuminating a water display, where the dashed lines indicate an alternate UAS position.

In another embodiment of the current invention as depicted in FIG. 3, the proximal end of tether 30 may be attached to winch 80 that may be used to cast out and/or reel in tether 30 to control the length of tether 30 and subsequently the vertical position of UAS 10. Winch 80 may also minimize slack in tether 30. In one example of this embodiment as shown in FIG. 3, UAS 10 may be instructed to provide constant lift in the Z direction with propellers 16 and winch 80 may release a length of tether 30 that may result in UAS 10 rising to level Z1 to shine illumination upon water display 500 from this level. It may be preferred that the constant lift provided by propellers 16 may be adequate to keep tether 30 taut.

Winch 80 may then release more length of tether 30 such that UAS 10 may rise further to level Z2 (as shown by the dashed line) to shine illumination upon water display 500 from this new level. One can see that in this configuration, winch 80 may effectively control and set the height of UAS 10 to any position within the length of tether 30 by casting out and reeling in tether 30. It should be noted that in this embodiment, UAS 10 may have traveled in the X and Y coordinates such that tether 30 may control or limit its travel in these coordinates as well.

In this scenario, UAS 10 may not be required to include its own onboard GPS and flight control systems and may not need to receive flight control commands from ground station 50. This may allow UAS 10 to be "dumbed down" and not include the navigation systems that add cost, complexity and weight to UAS 10. This may allow for off-the-shelf UASs 10 to be tethered and used for the purposes described above thus avoiding the high cost of developing new UASs 10 for these specific purposes.

In addition, the elimination of onboard navigational systems may allow UAS 10 to carry other types of payloads due to the reduced weight of the overall UAS 10. This reduced weight may also help tethered UAS 10 to achieve a sufficiently light weight to avoid regulations described above.

It should be noted that while FIG. 3 shows a single winch 80 controlling a single UAS 10, multiple winches 80 may be positioned to control multiple UASs 10 to illuminate water display 500 from various positions and heights. This may result in an array of winches 80 controlling a multitude of UASs 10.

Although winch 80 may be controlled manually by a human operator using a joystick or other type of manual control system, it may be preferred for winch 80 to be programmable or to be generally controlled by an automated control system. In this regard, programmable winch 80 may be programmed or controlled to cast out and reel in particular lengths of tether 30 in choreographed sequences such that the movements of UAS 10 may be synched or coordinated with the water and light elements of water display 500, rising and descending as desired while illuminating display 500.

For example, programmable winch 80 may release a programmed length of tether 30 to position UAS 10 so that it may illuminate the top of a water stream within water display 500. The water stream may begin to rise in height and as it does, winch 80 may release additional lengths of tether 30 coordinated with the rising stream such that UAS 10 may also rise in sequence with the stream while continuing to illuminate it with its lighting system 100. Conversely, winch 80 and thus UAS 10 may be programmed to descend as the water streams in display 500 are lowered.

It can be seen that in the case of an array of multiple winches 80 controlling a multitude of UASs 10, the entire array of winches 80 may be controlled in unison and coordinated with a number of water and light elements of water display 500 resulting in a relatively complex visually choreographed lighted water display show.

Note that while this specification uses the term "winch" to define the mechanism that may reel in and cast out lengths of tether 30 to control the length of tether 30 connected to UAS 10, other types of mechanisms may also be used for these purposes. Such other types of mechanisms may include reels, pulley systems, or other types of systems or mechanisms that may adjust the length of tether 30 that may extend from the ground to UAS 10.

In another embodiment, arrays of UASs may be controlled by a single long torque tube or tubes (not shown) fitted with multiple tethers to provide a simple method of synchronization. That is, multiple tethers 30 may extend through a tube or tubes before emerging from the tube(s) to extend to respective UASs 10.

Winch 80 may also control UAS 10 in more than one dimension. In one embodiment where winch 80 may remain stationary, X and Y movement may be controlled by the length of tether 30 released by winch 80. In another embodiment, where winch 80 may control UAS 10 in additional dimensions, winch 80 may have the ability to move its location in the X and Y dimensions such that tethered UAS 10 may also move in these dimensions. It should be noted that winch 80 may also control UAS 10 in the Z direction (as described above) while moving in the X and Y dimensions such that winch 80 may control UAS 10 in all three X, Y and Z dimensions.

For example, winch 80 may be attached to a carriage that may travel along rails positioned on or above the ground in the X and Y dimensions. The movement of the carriage may be controlled manually by a human operator, or may be programmable or generally controlled using an automated control system. As winch 80 moves along the rails in the X and Y dimensions, UAS 10 may be pulled by tether 30 such that it generally follows the same movement and is controlled to move in the same dimensions. At the same time, winch 80 may control the height of UAS 10 by casting out and reeling in tether 30 such that it also controls UAS 10 in the Z dimension. In this example, the rails upon which winch 80 travels may be positioned to run around water display 500 in a pattern that may allow UAS 10 to illuminate display 500 from a variety of choreographed positions and angles to enhance the entertainment factor of the display 500.

It should be noted that winch 80 may also utilize other means to move its position such as wheels, rollers, tethers and other mechanisms. Also, it should be noted that while the above description describes a single winch 80 moving in the X and Y dimensions while controlling a single UAS 10, multiple winches 80 may be configured to move in the X and Y dimensions with each winch 80 controlling a UAS 10 to illuminate water display 500 from various positions and heights. This may result in an array of winches 80 moving in the X and Y dimensions while controlling a multitude of UASs 10.

Figure 4:
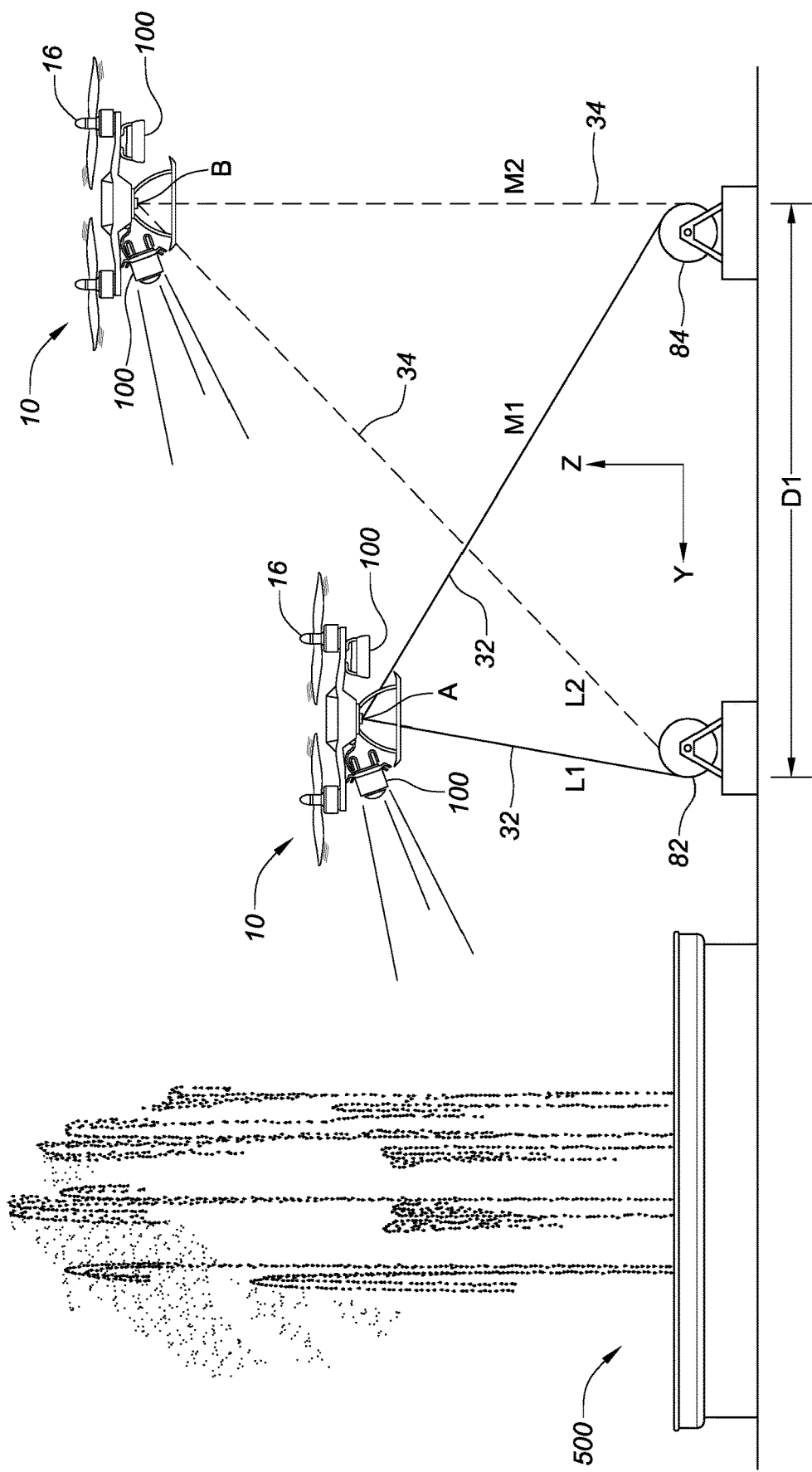
FIG. 4 is a side view of a tethered UAS controlled by two winches while illuminating a water display, where the dashed lines indicate an alternate UAS position.

In another embodiment, tethered UAS 10 may be controlled to move in multiple dimensions by utilizing multiple winches, with different winches controlling UAS 10 in different dimensions. For example, the addition of a second winch located in a position offset from first winch, and also connected to UAS 10 via the same tether or a different tether, may allow UAS 10 to be controlled in a second dimension. To elaborate on this, as shown in FIG. 4, UAS 10 may be tethered to winch 82 via tether 32 and to winch 84 via tether 34, with each winch 82, 84 positioned along the Y axis and offset by distance D1.

In this example, UAS 10 may be located at position A to provide illumination to water display 500 at a desired height via flight control data that instructs UAS 10 to rise vertically and provide lift while winch 82 may cast out length L1 of tether 32 and while winch 84 may cast out length M1 of tether 84. With propellers 16 providing vertical lift in the Z direction, tethers 32 and 34 may be taut and UAS 10 may be held in position A.

Next, to move UAS 10 in the Y and Z dimensions in order to position B to provide illumination to water display 500 from this new position, UAS 10 may be instructed so that propellers 16 continue to provide vertical lift to keep tethers 32 and 34 taut while winch 82 may gradually cast out additional length of tether 32 and while winch 84 may gradually reel in length of tether 34. UAS 10 may reach position B when tether 32 is taut and of length L2 and tether 34 is taut and of length M2 as depicted by the dashed tether lines in FIG. 4.

In this example, UAS 10 itself is only required to provide vertical lift in the Z dimension and is controlled to move in both the Z dimension and the Y dimension by winches 82, 84. It should be noted that this is a general example and that UAS 10 may be maneuvered and placed in other positions in the Y and Z dimensions to illuminate water display 500 by winch 82 casting out and reeling in different lengths of tether 32, and by winch 84 casting out and reeling in different lengths of tether 34 by themselves and/or in combination. It should also be noted that while this example depicts winches 82, 84 as positioned along the Y axis in order to control UAS 10 in the Y dimension, winches 82, 84 may be positioned along any other positions such as along the X axis or in positions not along the Y or X axis in order to control UAS 10 in other directions.

Figure 5A:
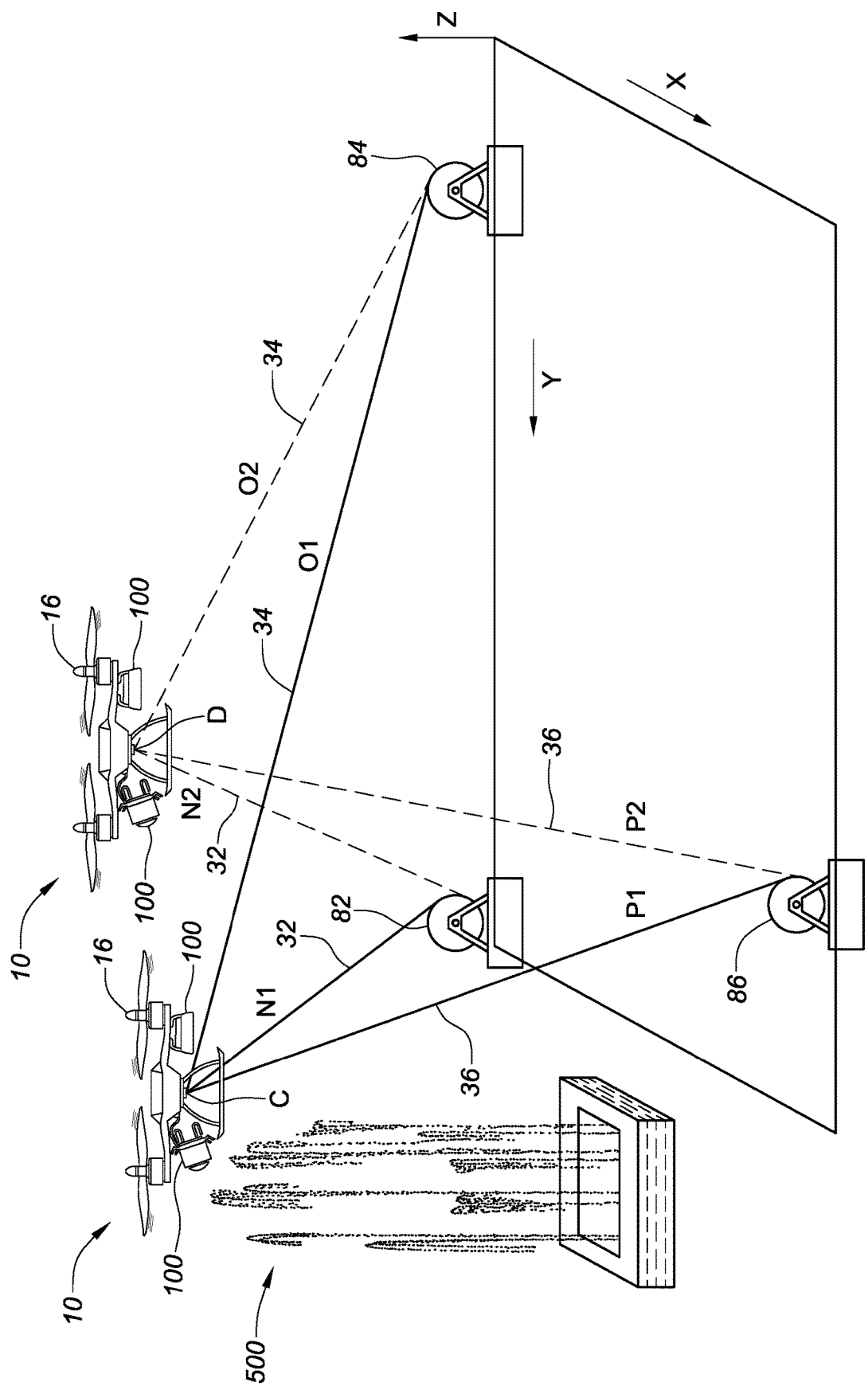
FIG. 5A is a perspective view of a tethered UAS controlled by three winches while illuminating a water display, where the dashed lines indicate an alternate UAS position.

Another embodiment of the current invention as depicted in FIG. 5A may involve a third winch 86 offset from winches 82, 84 in the general X dimension to allow UAS 10 to be controlled to move in this additional dimension. As shown, UAS 10 may be tethered to winch 82 via tether 32, to winch 84 via tether 34, and to winch 86 via tether 36. Winches 82, 84, 86 may be located in offset positions relative to each other in both the X and Y dimensions. While winch 82 and winch 84 are shown to be both located along the Y-axis, this may not be necessary and either or both winches 82 or 84 may be offset from the Y-axis in the X dimension.

In this example, to place UAS 10 into position C to provide illumination to water display 500 from this position, UAS 10 may be instructed via flight control data via tethers 32, 34, 36 to rise vertically and provide lift while winch 82 may cast out length N1 of tether 32, while winch 84 may cast out length O1 of tether 84 and while winch 86 may cast out length P1 of tether 36. With propellers 16 providing vertical lift in the Z direction, tethers 32, 34, 36 may be taut and UAS 10 may be held in position C.

Next, to move UAS 10 along the Y-axis, X-axis and Z-axis to position D to provide illumination to water display 500 from this new position, UAS 10 may be instructed so that propellers 16 continue to provide vertical lift to preferably keep tethers 32, 34, 36 taut while winch 82 may gradually cast out additional length of tether 32, while winch 84 may gradually reel in length of tether 34, and while winch 86 may cast out additional lengths of tether 36. UAS 10 may reach position D when tether 32 is taut and of length N2, tether 34 is taut and of length O2 and when tether 36 is taut and of length P2 as depicted in FIG. 5A.

In this example, UAS 10 itself may only be required to provide vertical lift in the Z dimension and was controlled to move in the Z dimension, the Y dimension and the X dimension by the combination of winches 82, 84, 86. It should be noted that this is a general example and that UAS 10 may be maneuvered and placed in other positions in the Y, X and Z dimensions to illuminate water display 500 by winch 82 casting out and reeling in different lengths of tether 32, by winch 84 casting out and reeling in different lengths of tether 34, and by winch 86 casting out and reeling in different lengths of tether 36 alone and/or in combination. In addition, the number of winches used to control UAS 10 is not limited to one, two or three winches, and may include other numbers of winches placed in other positions. Additionally, lift of the UAS may be accomplished by relative light, e.g., lighter-than-air crafts rather than powered by propellers.

As with the embodiment regarding the use of a single winch to control the position of UAS 10, the embodiments regarding the use of multiple winches to control the position of UAS 10 also does not require UAS 10 to control its exact position. Instead, UAS 10 is only required to apply vertical lift with propellers 16 and may not be required to have any type of flight control or GPS systems on board at any time. This may allow tethered UAS 10 to enjoy the same benefits as described above for single winch applications regarding reduced cost, reduced complexity, reduced weight, the potential avoidance of regulations and other benefits.

Figure 5B:
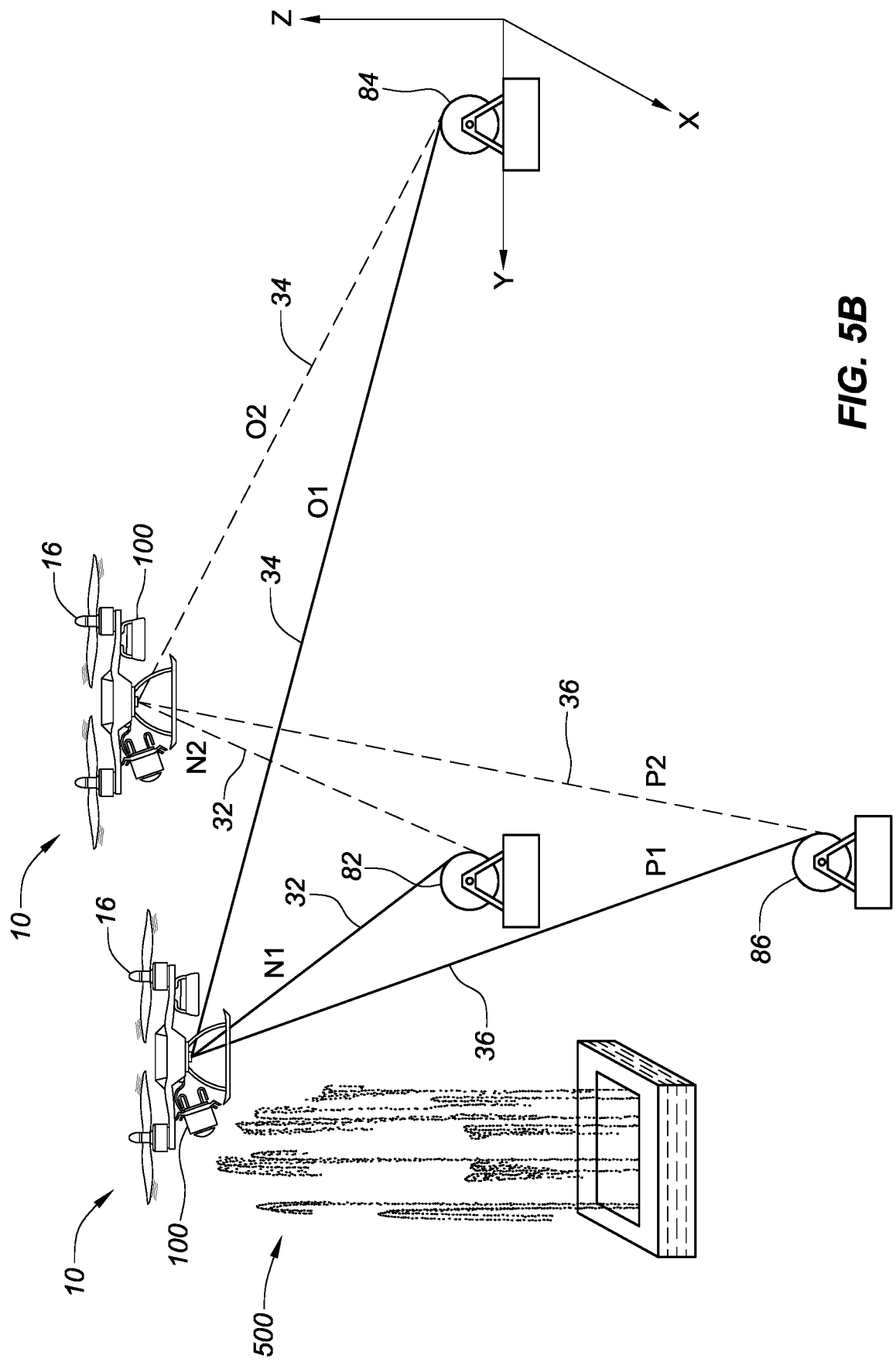
FIG. 5B is a perspective view of an alternate embodiment of a tethered UAS controlled by three winches, where the dashed lines indicate an alternate UAS position.

FIG. 5B shows the embodiment of FIG. 5A but without the lines between winches 82, 84, 86. This indicates that winches 82, 84, 86 need not be on the same plane or in any particular arrangement.

In addition, as with the single winch embodiment described above, multiple winches 82, 84, 86 may be controlled manually by a human operator using a joystick or other type of manual control input system. Alternately, winches 82, 84, 86 may be programmable or may be generally controlled by an automated control system. In this regard, winches 82, 84, 86 may be controlled to cast out and reel in particular lengths of tethers 32, 34, 36 respectively in choreographed sequences such that the movements of UAS 10 may be synched or coordinated with the water and light elements of water display 500, moving about from one position to another as desired while illuminating display 500 for entertainment purposes.

The safety benefits mentioned above are now further described further in connection with FIG. 2 and the use of tether 30 to restrict UAS 10 to within a safe-fly zone of radius A. These safety benefits may be realized with programmable winches or with winches controlled by an automated control system. Without the use of a winch to adjust the length of tether 30, the length of tether 30 of FIG. 2 may be static and may result in a safe-flying zone that may generally resemble a fixed circle with ground station 50 at the center of the circle and the radius of the circle defined by the length of tether 30.

Figure 6:
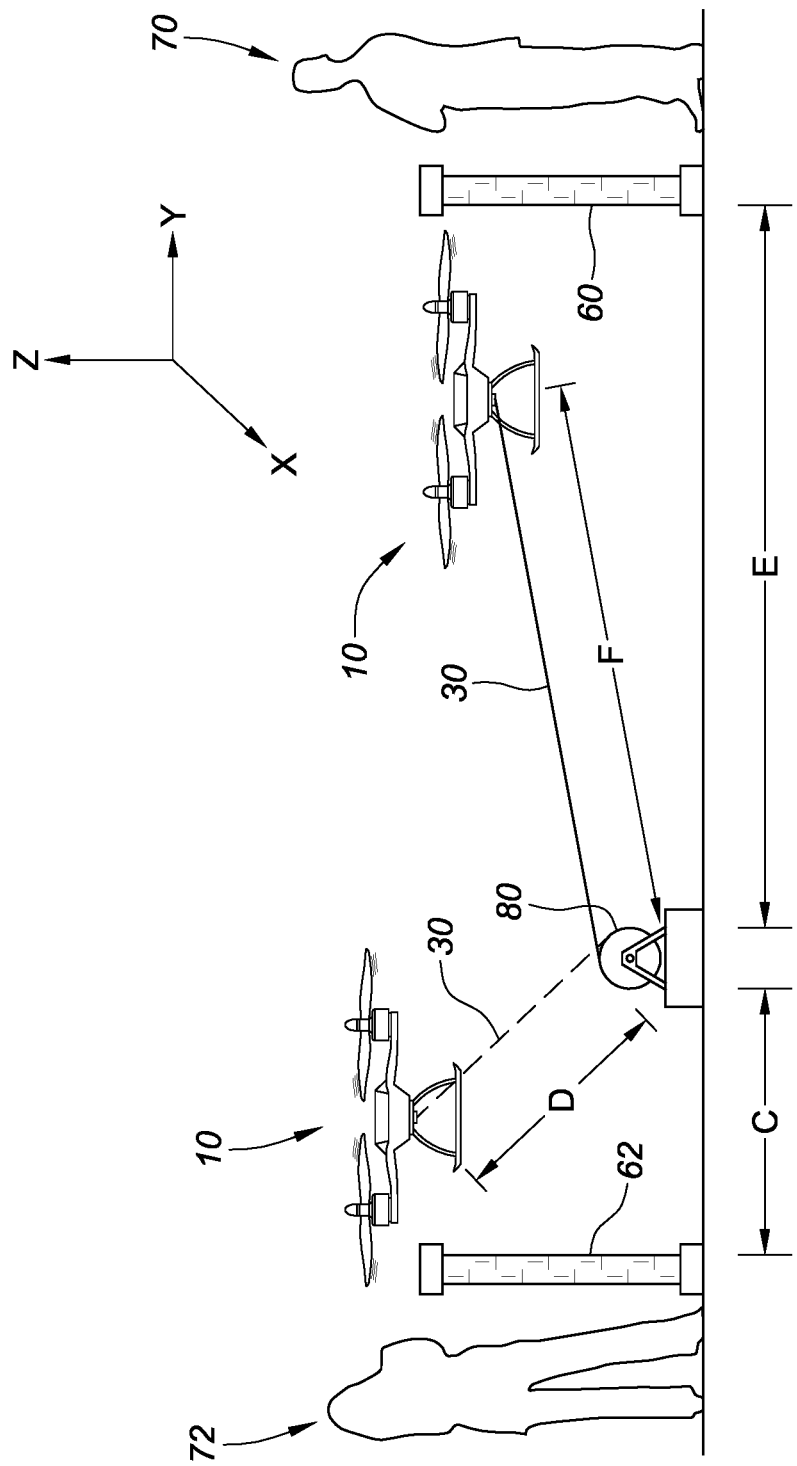
FIG. 6 is a side view of a tethered UAS controlled by a winch that controls the length of the tether to restrict the flying zone of the UAS.

However, when employing winch 80 to adjust the length of tether 30 at any point in time during the flight of UAS 10 as depicted in FIG. 6, winch 80 may cast out or reel in lengths of tether 30 to generally adjust the radius of the safe-flying zone depending on the position of UAS 10 relative to audience members 70, 72 and/or structures 60, 62. In the example depicted in FIG. 6, with length E greater than length F, a tether 30 of length F may prevent UAS 10 from colliding with structure 60 and/or audience member 70 positioned beyond length E from winch 80. Similarly, at another location, with length C greater than length D, a tether 30 of length D may prevent UAS 10 from colliding with structure 62 and/or audience member 72 positioned beyond length E from winch 80. However, because length C is less than length F, tether 30 of length F may not limit UAS 10 from colliding with structure 62 and audience member 72 generally positioned at distance C from winch 80.

Given this, it may be preferable that because winch 80 may adjust the length of tether 30 during the flight of UAS 10, winch 80 may reel in a length of tether 30 such that tether 30 may be of length D when approaching audience member 72 and/or structure 62 such that tether of length D may limit UAS 10 from colliding with audience member 72 and/or structure 62 positioned beyond distance C from winch 80.

Winch 80 may be controlled manually by a human operator, may be programmable or may be controlled by an automated control system. If winch 80 is programmable or is controlled by an automated control system, the general layout, map and coordinates of water display 500, including no-fly zones where audience members and/or structures may be located that need to be avoided by UAS 10, may be programmed into programmable winch 80 and/or into the automated control system controlling winch 80. This way, winch 80 may be automatically controlled to reel in and cast out lengths of tether 30 in order to control the length of tether 30 to restrict UAS 10 from entering any no-fly zones as UAS 10 maneuvers about display 500. This may ensure the safety of audience members and nearby structures from any danger of an errant UAS 10 crashing due to malfunction, extreme wind conditions or other conditions that may cause UAS 10 to crash.

It should be noted that while the above example with relation to FIG. 6 depicts winch 80 adjusting the length of tether 30 to limit the flying radius of UAS 10 in the Y dimension, winch 80 may also adjust the length of tether 30 to limit the flying radius of UAS 10 in the X dimension or in any other direction.

In addition, the use of multiple winches to control the position of UAS 10 as described above may also result in the ability to restrict UAS 10 from flying into no-fly zones. Returning now to FIG. 4, winches 82, 84 may each cast out and reel in lengths of tether 30 to restrict UAS 10 from flying into no-fly zones that may be generally located in the Y dimension. Similarly, in FIGS. 5A and 5B, winches 82, 84, 86 may each cast out and reel in lengths of tether 30 to restrict UAS 10 from flying into no-fly zones that may be located in any X and Y dimensions.

Returning now to FIG. 4 in relation to the use of winches 82, 84 to control the position of UAS 10, winches 82, 84 may also be used to restrict UAS 10 from flying into no-fly zones to ensure the safety of audience members and nearby structures. To elaborate, winch 82 may cast out and reel in lengths of tether 32 to control the length of tether 32 at all times and winch 84 may cast out and reel in lengths of tether 34 to control the length of tether 34 at all times. Winches 82, 84 may be controlled manually by a human operator, may be programmable or may be controlled by an automated control system.

If winches 82, 84 are programmable or are controlled by an automated control system, the general layout, map and coordinates of water display 500, including no-fly zones where audience members and structures may exist that need to be avoided by UAS 10, may be programmed into programmable winches 82, 84 or into the automated control system controlling winches 82, 84. This way, winches 82, 84 may be automatically controlled to reel in and cast out lengths of tethers 32, 34 respectively in order to control the length of tethers 32, 34 to restrict UAS 10 from entering any no-fly zones as UAS 10 maneuvers about display 500.

This preferably ensures the safety of audience members and nearby structures from any danger of an errant UAS 10 crashing due to malfunction, extreme wind conditions or other conditions that may cause UAS 10 to crash. It should be noted that while FIG. 4 depicts winches 82, 84 as being positioned along the Y-axis to control and restrict the position of UAS 10 along this dimension, winches 82, 84 may be located in any position in order to control and restrict the position of UAS 10 along the general axis defined by the positions of winches 82, 84.

Referring now to FIGS. 5A and 5B in relation to the use of winches 82, 84, 86 to control the position of UAS 10, winches 82, 84, 86 may also be used to restrict UAS 10 from flying into no-fly zones to ensure the safety of audience members and nearby structures. To elaborate, winch 82 may cast out and reel in lengths of tether 32 to control the length of tether 32, winch 84 may cast out and reel in lengths of tether 34 to control the length of tether 34, and winch 86 may cast out and reel in lengths of tether 36 to control the length of tether 36. Winches 82, 84, 86 may be controlled manually by a human operator, may be programmable or may be controlled by an automated control system. If winches 82, 84, 86 are programmable or are controlled by an automated control system, the general layout, map and coordinates of water display 500, including no-fly zones where audience members and/or structures may exist that need to be avoided by UAS 10, may be programmed into programmable winches 82, 84, 86 or into the automated control system controlling winches 82, 84, 86. This way, winches 82, 84, 86 may be automatically controlled to reel in and cast out lengths of tethers 32, 34, 36 respectively to order to control the length of tethers 32, 34, 36 and to restrict UAS 10 from entering any no-fly zones as UAS 10 maneuvers about display 500.

This preferably ensures the safety of audience members and nearby structures from any danger of an errant UAS 10 crashing due to malfunction, extreme wind conditions or other conditions that may cause UAS 10 to crash. It should be noted that while FIG. 5 depicts winches 82, 84 as being positioned along the Y-axis, winches 82, 84 may be located in positions offset from the Y-axis in the X dimension in order to, in combination with winch 86, control and restrict the position of UAS 10 the X and Y dimensions.

In addition, other safety mechanisms may also be employed to ensure the safety of audience members and bystanders that may be located near water display 500. In one embodiment that is relevant for use with a single winch configuration or with multi-winch configurations, UAS 10 may continually monitor its onboard systems for alerts to possible problems or malfunctions that may cause UAS 10 to crash or otherwise operate improperly, and may continually communicate this information to ground station 50, to operators manually controlling winches 80, 82, 84, 86, to programmable winches 80, 82, 84, 86 or to any automated control system that may be controlling winches 80, 82, 84, 86. If this data is deemed to be a significant threat to the wellbeing of UAS 10, audience members and nearby structures, an "emergency reel in" command may be issued to winches 80, 82, 84, 86 so that they may immediately or quickly reel in tethers 30, 32, 34, 36 in order to bring UAS 10 to an immediate landing within the safe-flying zone. It may be preferred that winches 80, 82, 84, 86 reel in tethers 30, 32, 34, 36, respectively, in a coordinated effort such that UAS 10 and tethers 30, 32, 34, 36 are not damaged during the emergency landing of UAS 10. It may also be preferable that the tethers are reeled in at a high enough velocity such that even if UAS 10 is in a free fall, tethers 30, 32, 34, 36 may reel in quick enough to ensure a safe landing of UAS 10 within a safe-flying zone.

In another embodiment, infrared light sources projecting beams upward, or generally at the potential flight path of UAS 10, may be positioned on or near the ground at the perimeters of safe-flying zones, and sensors onboard UASs 10 may be configured to detect the beams upon flying through them. If the sensors onboard UAS 10 detect the beams, UAS 10 may be passing from a safe-flying zone into a no-fly zone and may be immediately instructed by its own flight control system or by a ground-based flight control system to immediately stop and reverse, return to base or land immediately. This safety mechanism may be utilized as an additional safety system in case other safety mechanisms fail due to tether breakage, radio failure or other malfunctions that may cause UAS 10 to errantly fly into a no-flyzone. While this description describes the light sources as infrared, other types of light sources and other frequencies of light may be used.

In another embodiment, infrared light sources and detectors may be positioned at the perimeters of safe-flying zones such that beams of light may transmit from the sources to the detectors across areas of air space that may be obstructed by UAS 10 if UAS 10 flies from a safe-flying zone into a no-fly zone. If UAS 10 flies through a beam of light such that it is obstructed, the detector may immediately recognize the existence of UAS 10 flying from a safe-fly zone to a no-fly zone and may alert the control system of UAS 10 (whether onboard or ground-based). UAS 10 may then be immediately instructed by its own flight control system or by a ground-based flight control system to immediately stop and reverse, return to base or land immediately. This safety mechanism may be utilized as an additional safety system in case other safety mechanisms fail due to tether breakage, radio failure or other malfunctions that may cause UAS 10 to errantly fly into a no-fly zone. While this description describes the light sources as infrared, other types of light sources and other frequencies of light may be used.

It should be noted that while the embodiments described above depict a single UAS 10 tethered to one, two or three tethers, with or without the use of winches, multiple UASs 10 may be daisy chained or otherwise connected or configured together and controlled by the same tether or tethers and by the same winch or winches. These UASs 10 may be daisy chained vertically, horizontally or in any configuration that allow the multiple UASs 10 to be tethered together and controlled by the same system of tethers and winches.

The tethered UASs of the current invention may be used outdoors or indoors. When used indoors, the tether mechanism may be suited for use with relatively light UASs, e.g., lighter-than-air UASs. To this end, where no-wind conditions exist, UASs 10, or blimps, spheres or other aerial objects, may preferably use the tethering system of the current invention with reliability. Also, when used indoors, or under a roof or overhang, GPS or positioning data may not be readily available. Accordingly, the tethering system of the current invention may be used to control the flight of UASs 10 or other aerial object.

Figure 7:
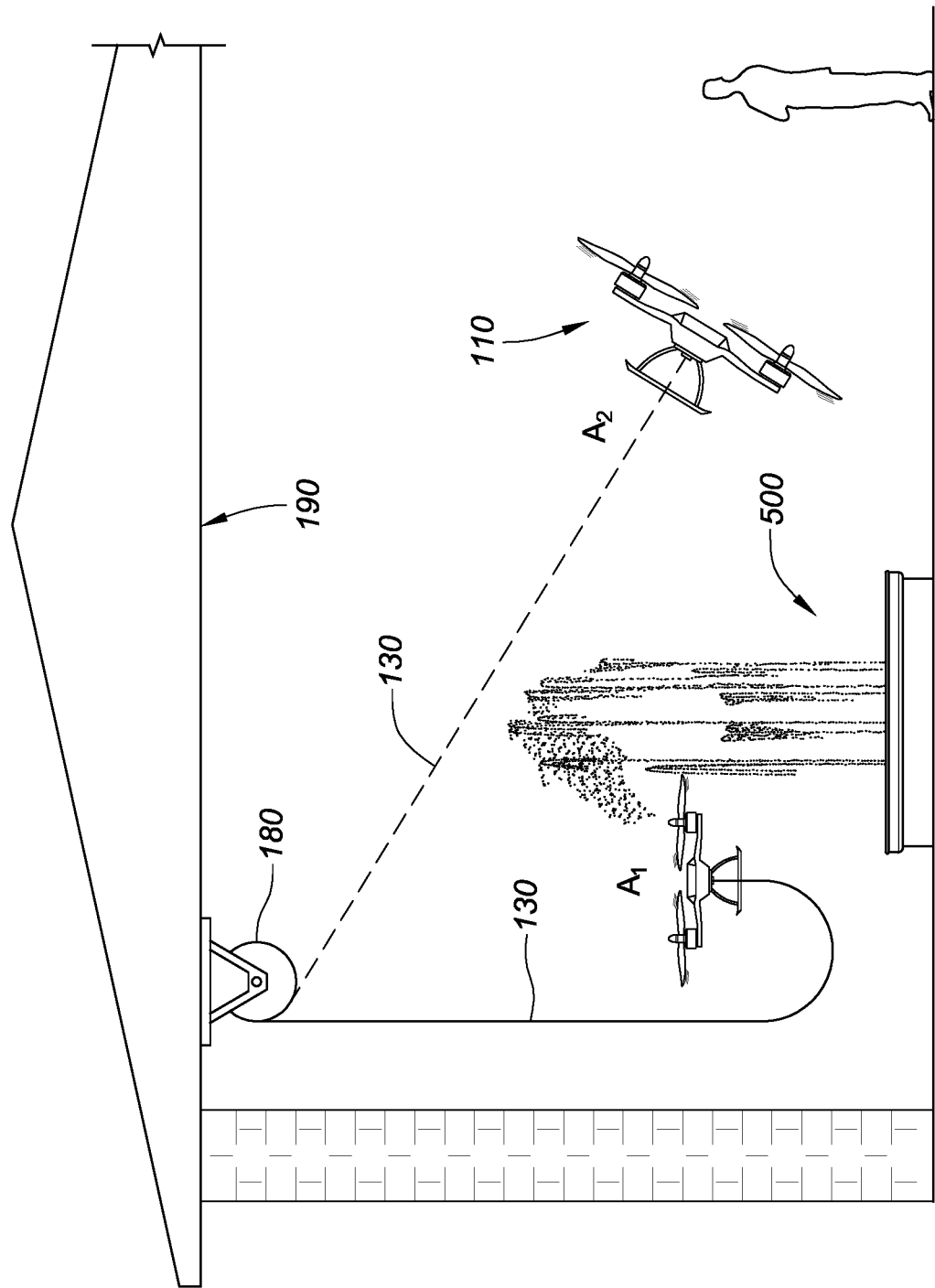
FIG. 7 is a side view of a tethered UAS where the tether extends above the UAS to an overhead winch.

While the foregoing embodiments relate to tethers that generally extend downward from UASs 10 toward the ground or other base location, the current invention also includes embodiments where the tethers may generally extend upward from UASs 10. For example, as shown in FIG. 7, one or more winches 180 may be located above UASs 110 to control their flight and tether(s) 130 may extend therebetween. To this end, an overhead array of winches may control the overall containment UASs 10 or other aerial object. This may provide an advantage or having most of the weight of the tether suspended by winch 180, rather than lifted by UAS 110. In this embodiment, UAS 110 may need to only support the weight of whatever slack tether material 130 may be hanging below it, such as when it is in position A$_1$. In position A$_1$, UAS 110 may also support whatever weight component may exist where the UAS is not located directly below the winch above. In this embodiment, UAS 110 need not support the weight of the entire length of the tether. This embodiment may be particularly suited for indoor applications where there is a roof or other support structure 190 above UASs 110 from which to hang winch(es) 180.

As also shown in FIG. 7, UAS 110 may also fly to position A$_2$ where tether 130 may be relatively taut as shown by the dashed line. In this type of position, UAS 110 may actually flip over as it flies away from winch 180. This may provide additional lighting opportunities of display 500. Winch 180 may also move along structure 190, which would reduce the energy required for tether deflection, if the winch were on a moving track programmed to stay above the drone.

Figure 8:
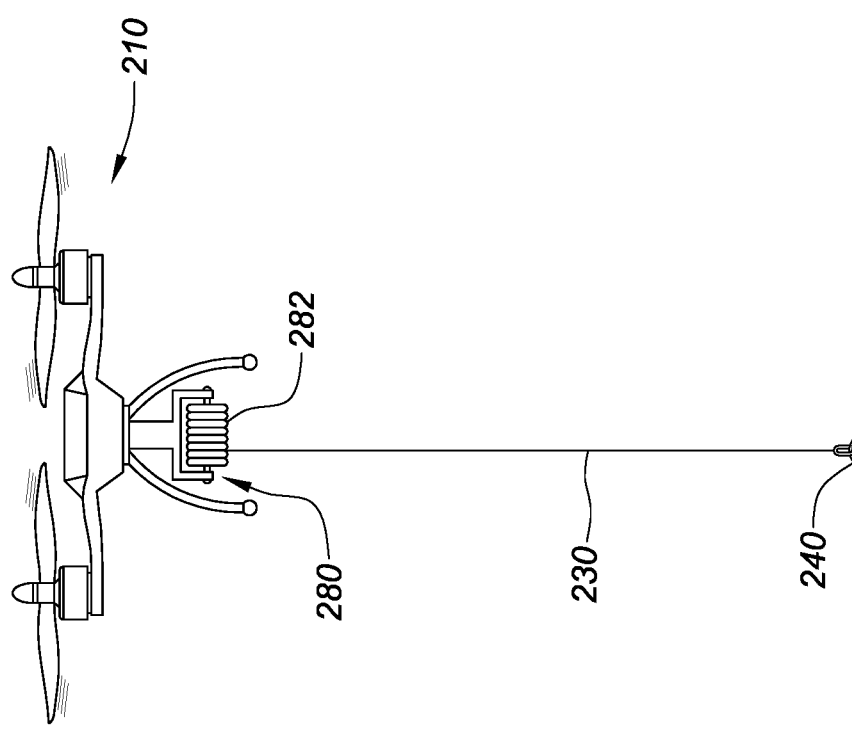
FIG. 8 is a side view of a UAS that carries a tether and winch assembly.
Figure 9:
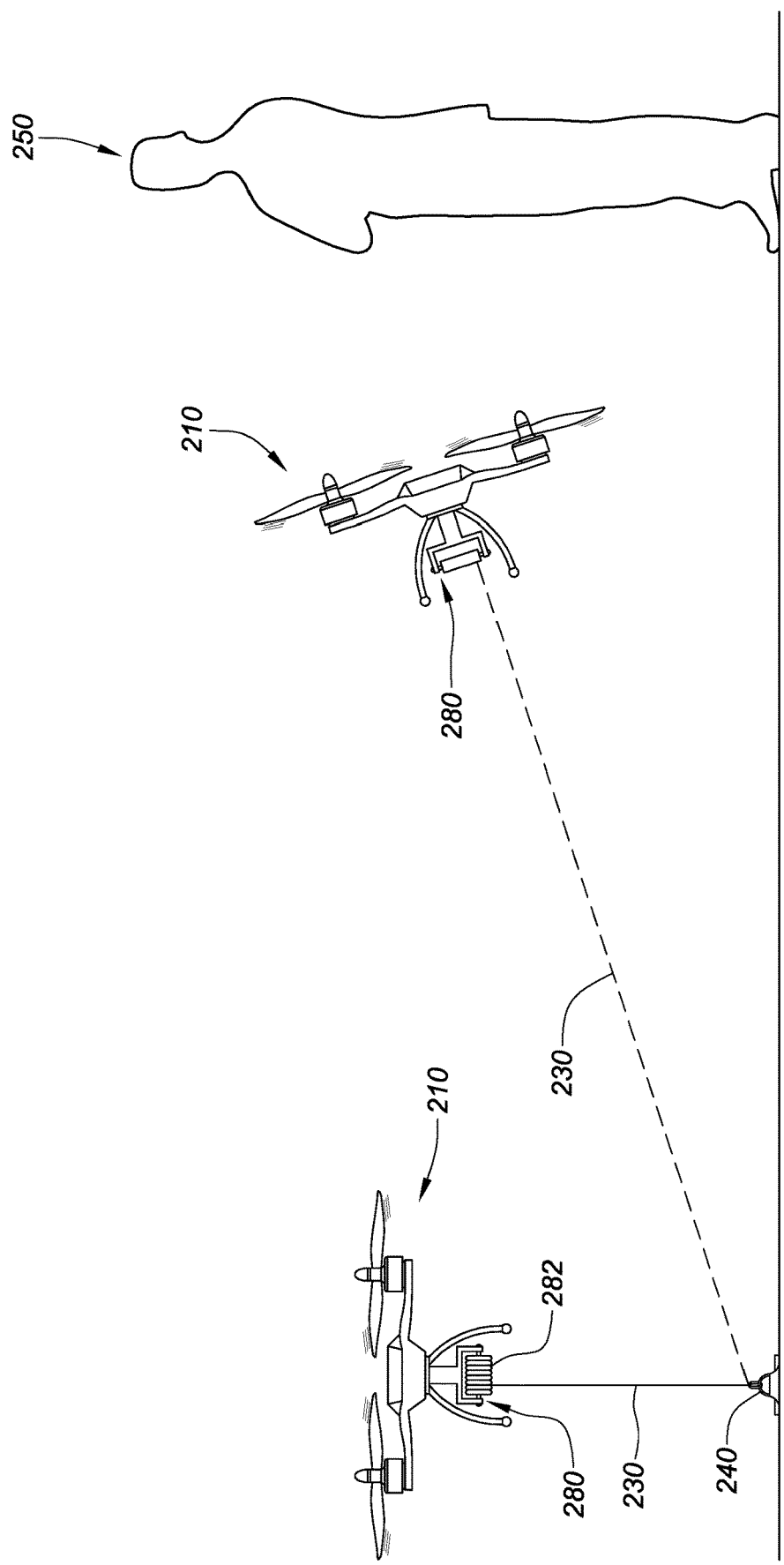
FIG. 9 is a side view of a UAS that carries a tether and winch assembly.

The current invention also includes embodiments where the UAS includes one or more winch(es), as shown in FIGS. 8 and 9, instead of the winch(es) being located on the ground or other base location. In this manner, UASs 210 may be generally self-contained by including onboard winch(es) 280 and tether(s) 230, and/or controllers so that they may be pre-programmed for flight and/or tether-winching activities.

This embodiment may provide increased flexibility in the design, transportability and operation of water and/or light displays. For example, the display may be designed so that it may be transported to multiple locations, because the operator may design and operate the display with a number of UASs 210 at one location, and then transport the cache of UASs 210 to a new location, where the operator may only need to place weights 240 on the ground or employ other types of ground or base locations, to which the distal ends of tethers 230 may be coupled. This preferably allows the UASs to perform the functions described above with a comparatively inert and/or relatively simple ground or other base stations.

In this embodiment, UAS 210 may carry the weight of tether 230 and winch 280 in flight. However, whether tether 230 is partially deployed or not, certain applications where transportability and/or other parameters are desired may make this embodiment suitable.

In this embodiment, reel 282 of winch 280 may be supported by UAS 210. If the propellers of UAS 210 in this embodiment are self-powered by battery, another power source may be used to power onboard winch 280. This preferably addresses the situation where UAS 210 has some type of propeller failure, which might also cause the winch mechanism 280 of UAS 210 to also malfunction leading to a dual failure, and not provide the check and balance effect of an intelligent ground station. Where a dual power source is not used, or in any event, spectators 250 may be kept back a safe distance beyond where tether 230 is fully deployed, as shown by the dashed line in FIG. 9. In this manner, a safe zone may be determined. As noted above, this embodiment may be particularly suited for traveling shows.

Although certain presently preferred embodiments of the invention have been described herein, it will be apparent to those skilled in the art to which the invention pertains that variations and modifications of the described embodiments may be made without departing from the spirit and scope of the invention. It is intended that the claims herein be interpreted to cover any such modifications. It is further intended that the present invention be not limited according to any particular disclosed embodiment, but rather only according to the appended claims.

What is claimed is:

1. An unmanned aerial system (UAS) for use with a water display, comprising:
   a UAS;
   one or more tracks that are positioned in proximity to the water display;
   a base that is configured to travel along the one or more tracks; and
   a tether having first and second ends, wherein the first end is coupled to the UAS, the second end is coupled to the base, and the tether provides power to the UAS;
   wherein the base is configured to extend and retract the tether to vary the positions of the UAS, and wherein the base travels along the one or more tracks, in relation to the water display so that the positions of the UAS are choreographed with the water display.

2. The UAS system of claim 1, wherein the base includes a first winch that extends and retracts the tether in relation to the water display.

3. The UAS system of claim 2, further comprising a second base that is configured to travel along the one or more tracks, and that includes a second winch and a second tether coupled to the UAS and the second winch, wherein the first and second winches control the positions of the UAS in two directions in relation to the water display.

4. The UAS system of claim 1, wherein the tether provides commands to the UAS so that the positions of the UAS are choreographed with the water display.

5. The UAS system of claim 4, wherein the UAS includes a light, and wherein the tether provides commands to the UAS to turn on and/or turn off the light that are choreographed with the water display.

6. A water display, comprising:
   a fountain that emits a water stream at varying heights;
   one or more tracks that are positioned in proximity to the water display;
   at least one unmanned aerial system (UAS);
   a base that is configured to travel along the one or more tracks; and
   a tether having first and second ends, wherein the first end is coupled to the base, the second end is coupled to the UAS, and the tether provides power or control signals to the UAS; and
   wherein the base travels along the one or more tracks and the tether is extended and retracted to control the position of the UAS in proximity to the fountain so that the position of the UAS is choreographed with the height or other characteristic of the water stream.

7. The water display of claim 6, wherein the UAS includes a light that shines on the water stream, and the tether provides commands to the UAS to turn on and/or turn off the light that are choreographed with the water stream.

8. The water display of claim 6, further comprising:
   a plurality of water fountains that emit streams of water at varying heights or other characteristics;
   a plurality of tracks that are positioned in proximity to the plurality of water fountains; and
   a plurality of bases that are each configured to travel along the plurality of tracks, wherein each base includes an extendable and retractable tether and a UAS coupled to the tether;
   wherein the plurality of bases travel along the plurality of tracks while extending or retracting their tethers to control the positions of their UASs in multiple dimensions thereby choreographing their UASs with the varying heights or other characteristics of the plurality of water streams.

9. The water display of claim 8, wherein the plurality of tracks are positioned between the plurality of water fountains.

10. The water display of claim 9, wherein at least some of the UASs include a light, and wherein one or more of the lights are programmed to shine light on the water streams so as to be choreographed with the water streams.

* * * * *